Dec. 8, 1942.   H. S. PARDEE   2,304,650
PISTON
Filed Aug. 1, 1940
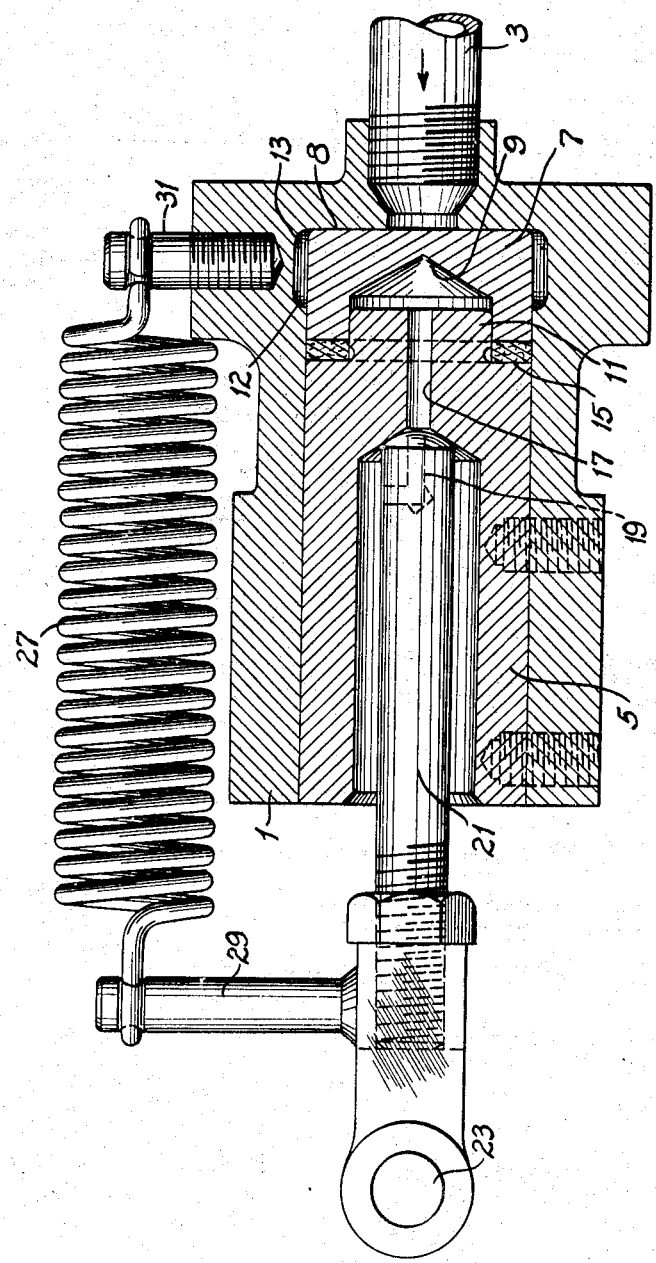
Harvey S. Pardee,
Inventor.
Haynes and Koenig
Attorneys.

Patented Dec. 8, 1942

2,304,650

UNITED STATES PATENT OFFICE 2,304,650

PISTON

Harvey S. Pardee, Ravinia, Ill.

Application August 1, 1940, Serial No. 349,199

1 Claim. (Cl. 309—31)

This invention relates to pistons, and with regard to certain more specific features, to pistons including packing which is radially expansive to seal against a cylinder in response to pressure on the piston.

Among the several objects of the invention may be noted the provision of a piston in which the packing (which is radially expansive in response to endwise pressure) is certain to be operative, without the occurrence of an undesirable floating condition; the provision of a piston of the class described in which is employed a low pressure for radial expansion, whereby low frictional values are determined; and the provision of a device of the class described which is simple and compact. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claim.

In the accompanying drawing, in which is illustrated one of various possible embodiments of the invention, the single figure is a longitudinal section of a cylinder with a piston therein, illustrating the invention.

Similar reference characters indicate corresponding parts.

Referring to the drawing, numeral 1 indicates a cylinder having a pressure inlet 3. In the cylinder is located a piston consisting of a skirt 5 and a co-axial head 7, both fitting and sliding in the cylinder. In the head 7 is a recess 9. In the recess is piloted a pilot extension 11 from the skirt 5. The recess 9 and pilot 11 slidingly fit. The edge 12 of a counterbore 13 in the cylinder 1 is passed during operation by the end 8 of head 7, so as to produce even wear throughout the parts of the cylinder 1.

Between the skirt 5 and head 7 is located an annular ring 15 of resilient homogeneous packing material, such as for example artificial rubber. It is preferable that this material withstand attack by lubricant. A material now on the market known as "neoprene" has this quality. These materials are characterized by being semi-solid and being capable per se of flowing under pressure and of retaining to an original shape after removal of pressure. Some consist in polymerized vinyl hydrocarbons. When confined and pressed, they tend to flow from any opening in the confining space. Thus, when pressure is placed upon the head 7 from the inlet 3, the head tends to move toward the skirt 5 and to compress the packing 15. The compressed packing then tends to expand radially and effect a seal against cylinder 1. Upon removal of pressure, the packing per se returns to its original shape.

In order that the full pressure on the head 7 may be applied on the packing annulus 15, pressure is relieved from the space 9 by way of an air passage 17. This passage 17 is continued as shown at 19 through a connecting rod 21 if the operating contact between said connecting rod 21 and the skirt 5 requires it to release pressure from the space 9.

The connecting rod 21 causes movement of a suitable pin 23 carried on a suitable linkage (not shown) which transmits the force of the plunger to the apparatus to be actuated. A spring 27 reacting from an arm 29 on the connecting rod and to a stud 31 on the cylinder effects the return stroke of the piston.

It will be understood that the connection herein shown between the connecting rod 21 and skirt 5 is one of abutment, but that other connections could be made, such as a wrist pin or the like.

A theory of the improved functioning of the device is as follows:

Let the area of the head 7 be two square inches, for example, and the end area of the packing annulus 15 be one square inch. Then a pressure of 1000 pounds per square inch at the inlet 3 pressing upon the two-square-inch head 7 will normally engender 2000 pounds total pressure, which is borne by the one square inch of packing 15 at a value of 2000 pounds per square inch. The total 2000 pounds is transmitted to the rod 21.

Since the space 9 is in communication with the atmosphere, the full 2000 pounds is applied to the packing 15 which responds by expanding radially. The radial pressure is less than the axial pressure. Any leakage of fluid past the head 7 and to the packing tends to hold in the packing from the cylinder wall and therefore to reduce wall friction.

At the same time there is no danger that the leakage will result in fluid getting in behind the packing 15 and balancing the pressure on the end of the head. This is what often occurs in the ordinary radial expanding packing due to the absence of any outlet such as 17 to atmosphere. In the present invention, there is no tendency of the head 7 or of the packing 15 to float. The head 7 is always instantaneously pushed down against the packing when fluid pressure is applied, thus promptly and positively sealing against leakage. Thus the invention is particularly applicable in cases where loads are likely to be quickly and intermittently applied, as in brake cylinders.

The use of differential areas, as between the head of the piston 7 and the annulus of the packing 15, is important. This differs from any case in which the area of the head 7 is equal (or substantially equal) to the end pressure area of the packing 15. This is due to the fact that the unit pressure on the packing can herein be controlled in design by a proper choice of the area of the annular packing, so that the normal leakage between the head and cylinder wall to the packing will provide the frictional values desired by suitably balancing radial pressure in the packing material. Any leakage passing into the space 9 does not result in balanced pressure around the head 7 or around the packing 15 as heretofore, because no pressure can build up in the space 9, due to the outlet 17. This fact in itself tends to prevent leakage between head 7 and packing 15, so that the advantageous effect is progressive.

It will be understood that the recess 9 may be formed in the skirt 5 and that the pilot member 11 may be carried on the head 7 if desired. This would constitute a simple inversion of parts.

This invention differs from the case where a solid plunger is separated from a floating head by a radially expansive packing. In the latter case the packing area is equal to the head area. Furthermore in the latter case, there is no pilot means necessary between the plunger and the head and none is used. In the present case, the pilot means is useful to prevent the head from cocking in the cylinder. Relieving pressure in the pilot means avoids the tendency to balance pressure on the head and packing.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

Means for transmitting force between a fluid chamber and mechanical means even under conditions of rapidly rising fluid pressure in said chamber, comprising a cylinder and a piston forming said chamber, said piston comprising a head element and a skirt element axially aligned and relatively movable in an axial direction, one of which has a pilot projection slidable in a guide recess in the other, the head and the skirt being formed to afford an intervening packing space which surrounds and is defined in part by said pilot projection, an annular semi-solid packing element composed of a rubber-like homogeneous substance which is expansible radially in response to axial pressure and self-retractable upon release of said pressure, said packing element being positioned in said space and expanding radially by axial approach of said head and skirt and contracting radially upon recession of said head and skirt; and unrestricted means for so freely venting the guide recess at the end of said pilot to atmosphere that the development of fluid pressure in said recess is inhibited regardless of speed of approach of the piston elements or the leakage of pressure fluid to said recess.

HARVEY S. PARDEE.